(12) United States Patent  
Wang et al.

(10) Patent No.: US 8,076,870 B2  
(45) Date of Patent: Dec. 13, 2011

(54) LED ILLUMINATION SYSTEM WITH MULTIPLE INDEPENDENT LOOPS

(75) Inventors: Chien-Lung Wang, Chupei (TW);
Chih-Wei Chen, Chupei (TW);
Ching-Hsien Lin, Chupei (TW)

(73) Assignee: Alliance Optotek Co., Ltd., Hsinchu (TW)

( * ) Notice: Subject to any disclaimer, the term of this patent is extended or adjusted under 35 U.S.C. 154(b) by 839 days.

(21) Appl. No.: 12/136,271

(22) Filed: Jun. 10, 2008

(65) Prior Publication Data

US 2009/0302783 A1    Dec. 10, 2009

(51) Int. Cl.
*H05B 41/36* (2006.01)

(52) U.S. Cl. .................................. 315/307; 315/312

(58) Field of Classification Search .............. 315/209 R, 315/224, 291, 307, 312–319
See application file for complete search history.

(56) References Cited

U.S. PATENT DOCUMENTS

| | | | | |
|---|---|---|---|---|
| 6,111,739 A * | 8/2000 | Wu et al. | ........................ | 361/106 |
| 6,528,782 B1 * | 3/2003 | Zhang et al. | ................... | 250/226 |
| 7,262,752 B2 * | 8/2007 | Weindorf | ......................... | 345/82 |
| 7,597,456 B2 * | 10/2009 | Catalano et al. | .......... | 362/249.02 |
| 7,902,771 B2 * | 3/2011 | Shteynberg et al. | ........... | 315/307 |
| 2008/0238340 A1 * | 10/2008 | Leung et al. | ................... | 315/297 |

* cited by examiner

*Primary Examiner* — Jacob Y Choi
*Assistant Examiner* — Jimmy Vu
(74) *Attorney, Agent, or Firm* — Chun-Ming Shih; HDLS IPR Services (57) ABSTRACT

A LED illumination system with multiple independent loops includes an input unit provided to receive a D.C. voltage, and a plurality of light module control circuits electrically connected to the input unit. Each of the light module control circuits includes a light module controller and two filtering units. The two filtering units are electrically connected to the light module controller, and receive D.C. power transmitted form the input unit to drive two set of LED illuminators, respectively. The light module controller controls current of the two set of LED illuminators via the two filtering units so as to control brightness of the LED illuminators, respectively. Therefore, the LED illuminators are controlled by the independent loops to reduce mutual influence among the LED illuminators.

7 Claims, 8 Drawing Sheets

LED ILLUMINATION SYSTEM WITH MULTIPLE INDEPENDENT LOOPS

BACKGROUND OF THE INVENTION

1. Field of the Invention

The present invention relates to an illumination system with multiple independent loops, and more particularly to a LED illumination system with multiple independent loops.

2. Description of the Related Art

General lighting has an enormous effect in human activities and product property. Conventional general lighting includes incandescent lamp, fluorescent lamp and so on.

Since Edison improved the incandescent lamp in 1879, the incandescent lamp has been providing the low-price and convenient lighting source all the time. However, the incandescent lamp has drawbacks of low lighting efficiency, high power consumption, short life-time, heat-generating, and being easily broken. Particularly, global warming is a critical issue these days, and those drawbacks of the incandescent lamp are becoming more and more concerned by people. The fluorescent lamp is also the main device for providing indoor luminescence, and, however, still has problems of mercury contamination and high-voltage driven radiation.

The blue light LED based on GaN (Gallium Nitride) series blue light LED technology proposed by Nichia Corp., Japan, in 1996, excites YAG (yttrium aluminum garnet) phosphors to generate yellow fluorescence mixed with blue light to produce white light (blue light LED with YAG phosphors), and, therefore, the LEDs are henceforth stepping into the luminescence market.

In comparison with the conventional incandescent lamp and fluorescent lamp, the white light LED has lots of advantages such as small physical size, low heat-generating, low power consumption, long lifetime, quick response time, environmental protection, flat package, and being easily developed for light weight and small size products. As the luminescence of the LED is improved and the LED cost downs is achieved, usages of the LED increases thereupon. Due to that the LED need to be D.C. voltage driven, if the LED wants to be applied to utility input (85Vac-264Vac) voltage usage, the corresponding driving circuits are essential.

Figure 1:
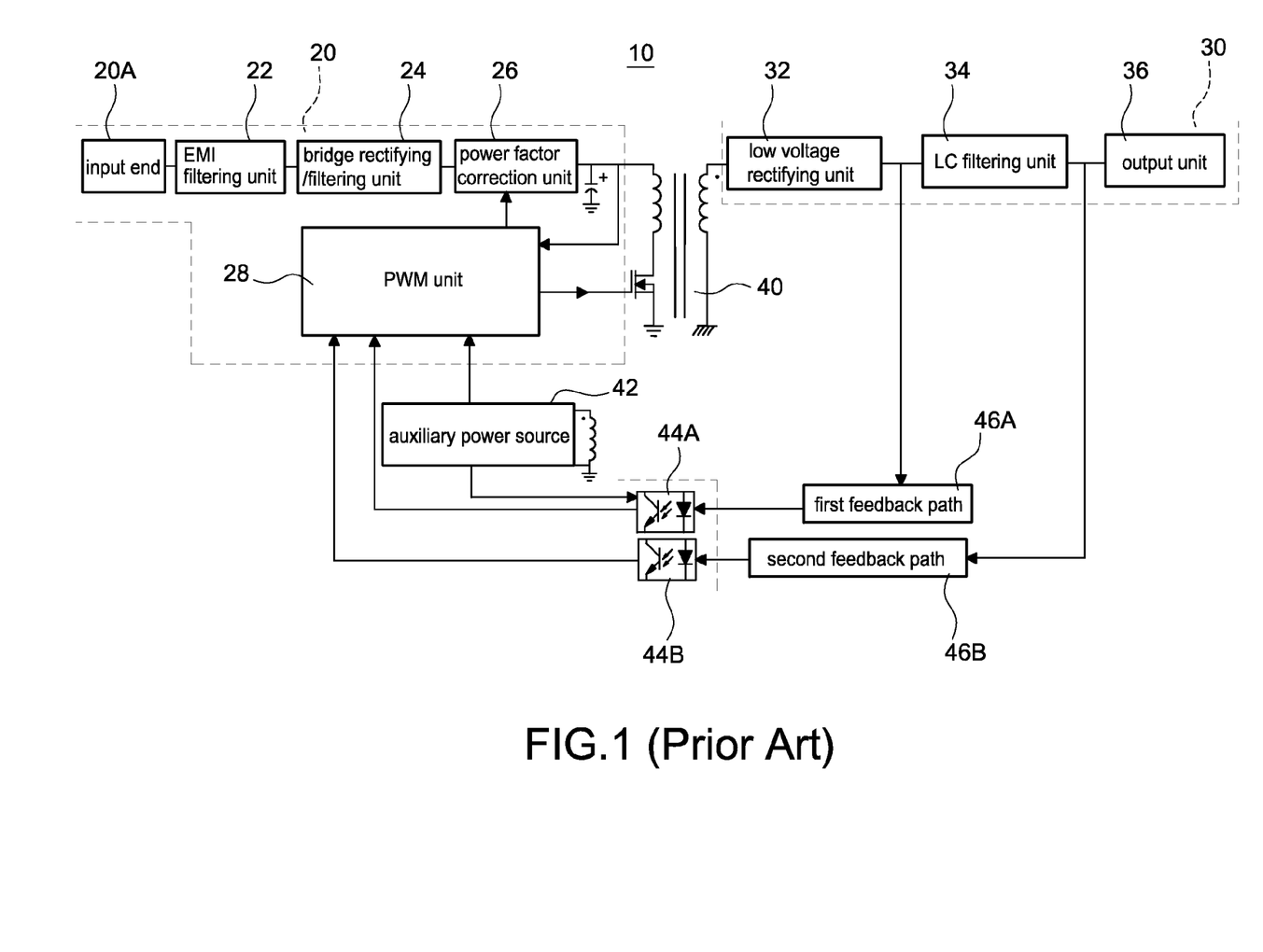
FIG. 1 is a related art LED driving circuit.

Reference is made to FIG. 1 which is a related art LED driving circuit. The LED driving circuit 10 comprises a high voltage circuit block 20, a low voltage circuit block 30, an isolated power inverter 40, and two photo couplers 44A, 44B. The isolated power inverter 40 is connected between the high voltage circuit block 20 and the low voltage circuit block 30. A utility input voltage (85Vac~264Vac) is inputted to an input end 20A, and the utility input voltage is sequentially processed by an EMI filtering unit 22, a bridge rectifying/filtering unit 24, and a power factor correction unit 26. The power factor correction unit 26 is controlled by a PWM unit 28. The power factor correction unit 26 outputs a voltage, and the outputted voltage is lowered by the isolated power inverter 40 to provide a desired voltage level, such as 24 volts. The low voltage circuit block 30 processes an outputted voltage of the isolated power inverter 40. The low voltage circuit block 30 includes a low voltage rectifying unit 32, a LC filtering unit 34, and an output unit 36. A digital-analog converter (DAC) (now shown) is built in the isolated power inverter 40 to convert a D.C. voltage outputted from the power factor correction unit 26 to a A.C. voltage, and the converted A.C. voltage is transformed into a lower A.C. voltage.

The LED driving circuit 10 further comprises a first feedback path 46A and a second feedback path 46B. The first feedback path 46A is connected between the low voltage rectifying unit 32 and the LC filtering unit 34, and the second feedback path 46B is connected between the LC filtering unit 34 and the output unit 36. The first feedback path 46A and the second feedback path 46B are connected to the photo coupler 44A and the photo coupler 44B, respectively, and provide feedback signals to the photo couplers 44A, 44B. In addition, the LED driving circuit 10 further comprises an auxiliary power source 42 to provide desired power to the PWM unit 28.

In addition, the multiple LEDs are mutually influenced when the multiple LEDs are simultaneously driven by the LED driving circuit 10.

Furthermore, it is desirable to integrate a low energy-consuming LED illumination apparatus with solar energy to reduce demand of the utility power because environment protection and energy saving were paid much attention recently. Furthermore, lighting efficiency will increase when the LED illumination apparatus is optimally controlled according to surrounding environmental light and temperature.

SUMMARY OF THE INVENTION

Accordingly, a primary object of the present invention is to provide a LED illumination system with multiple independent loops to reduce mutual influence among LED illuminators.

Another object of the present invention is to provide a LED illumination system with multiple independent loops and the illumination system can integrate with solar cells, light sensors, and remote controllers to increase lighting efficiency of LED illumination apparatuses.

In order to achieve the objectives mentioned above, the LED illumination system with multiple independent loops comprises an input unit provided to receive a D.C. voltage, and a plurality of light module control circuits electrically connected to the input unit. Each of the light module control circuits includes a light module controller and two filtering units. The two filtering units are electrically connected to the light module controller, and receive D.C. power transmitted from the input unit to drive two set of LED illuminators, respectively. The light module controller controls current of the two set of LED illuminators via the two filtering units so as to control brightness of the LED illuminators, respectively.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The above and further advantages of this invention may be better understood by referring to the following description, taken in conjunction with the accompanying drawings, in which.

The drawings will be described further in connection with the following detailed description of the present invention.

DETAILED DESCRIPTION OF THE PREFERRED EMBODIMENTS

Reference will now be made to the drawing figures to describe the present invention in detail.

Figure 2:
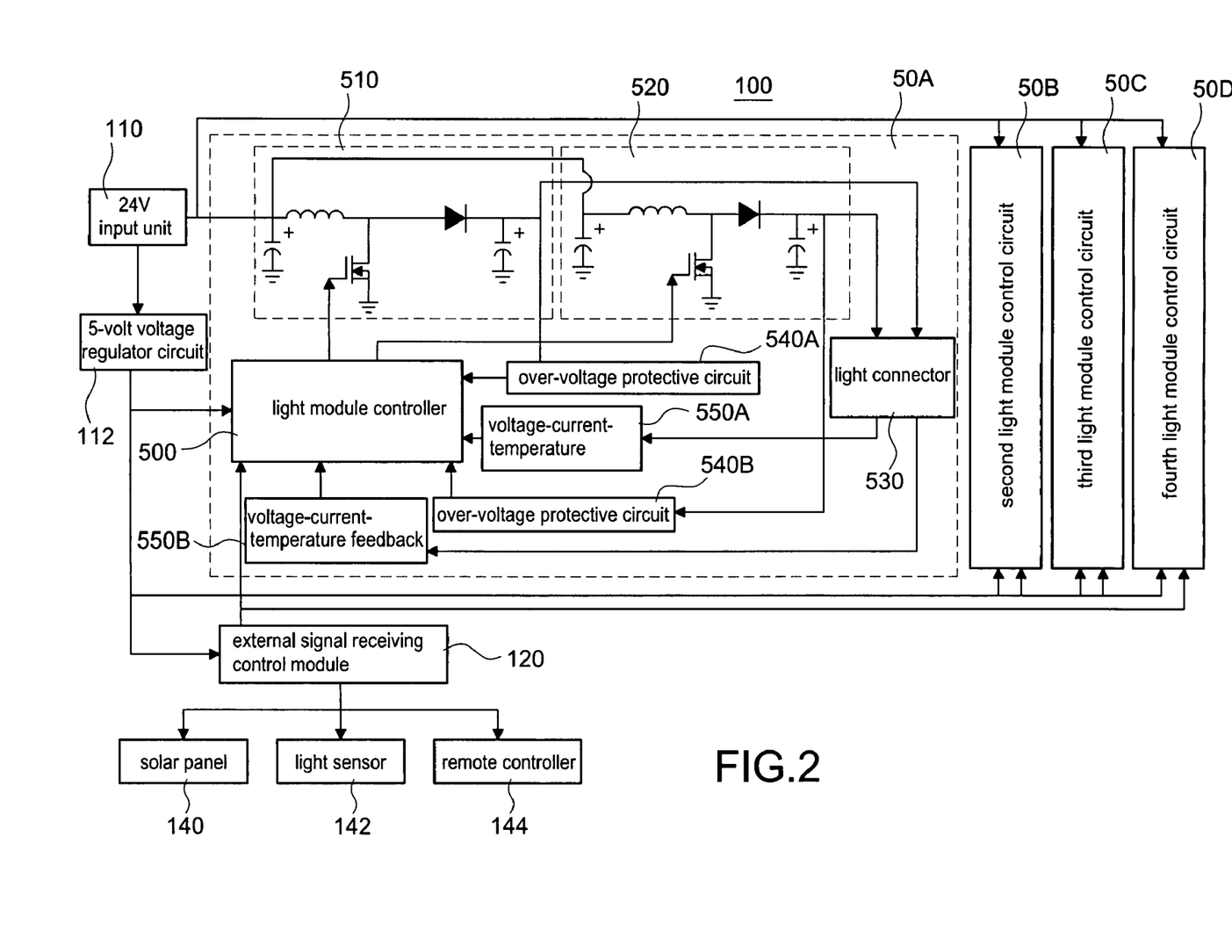
FIG. 2 is a schematic view of a preferred embodiment of a LED illumination system according to the present invention.

Reference is made to FIG. 2 which is a schematic view of a preferred embodiment of a LED illumination system according to the present invention. The LED illumination system 100 includes an input unit 110, a 5-volt voltage regulator circuit 112, an external signal receiving control module 120, and a plurality of light module control circuits. The light module control circuits are a first light module control circuit 50A, a second light module control circuit 50B, a third light module control circuit 50C, and a fourth light module control circuit 50D, respectively. The LED illumination system 100 further includes a solar panel 140, a light sensor 142, and a remote controller 144. Each of the light module control circuits (50A, 50B, 50C, or 50D) includes a light module controller 500, a first filtering unit 510, a second filtering unit 520, a light connector 530, two over-voltage protective circuits 540A, 540B, and two voltage-current-temperature feedback units 550A, 550B, respectively. The light connector 530 electrically connects two set of LED illuminators 560A, 560B, and provides power transmitted from the first filtering unit 510 and the second filtering unit 520 to the LED illuminators.

The first filtering unit 510 and the second filtering unit 520 receive a D.C. voltage provided from the input unit 110, respectively, and the D.C. voltage is generated by a circuit shown in FIG. 1. The D.C. voltage is controlled by the light module controller 500 and the controlled D.C. voltage is supplied to the light connector 530. The first filtering unit 510 and the second filtering unit 520 have passive elements (not labeled) and active elements (not labeled), respectively. The passive elements include inductors, capacitors, and diodes; the active elements include transistors. The active elements are controlled by the light module controller 500 to change D.C. voltage level of the filtering units 510, 520. More particularly, the light module controller 500 connects to gates of the transistors of the first filtering unit 510 and the second filtering unit 520 to change equivalent resistance of the transistors so as to change outputted D.C. voltage level of the first filtering unit 510 and the second filtering unit 520.

Figure 3:
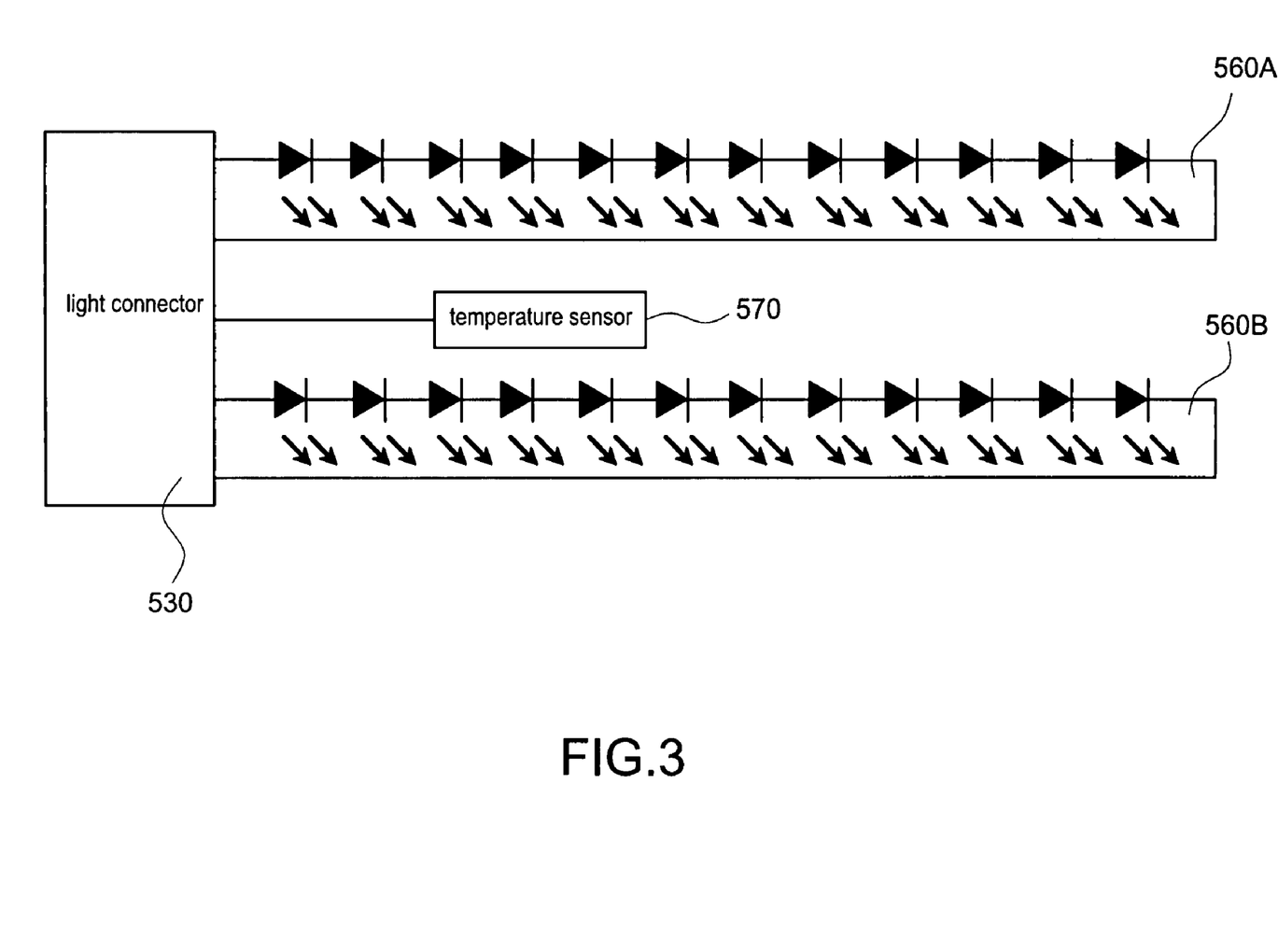
FIG. 3 is a schematic view of connecting a light connector and two set of LED illuminators.

Reference is made to FIG. 3 which is a schematic view of connecting a light connector and two set of LED illuminators. The light connector 530 provides power transmitted from the first filtering unit 510 and the second filtering unit 520 to the two set of LED illuminators 560A, 560B. The LED illumination system 100 provides a temperature sensor 570 to sense a temperature between the two set of LED illuminators 560A, 560B. Because a temperature in the middle light module control circuit is generally higher than other location, the temperature sensor 570 is preferably installed in the middle light module control circuit, such as the second light module control circuit 50B or the third light module control circuit 50C.

Figure 4:
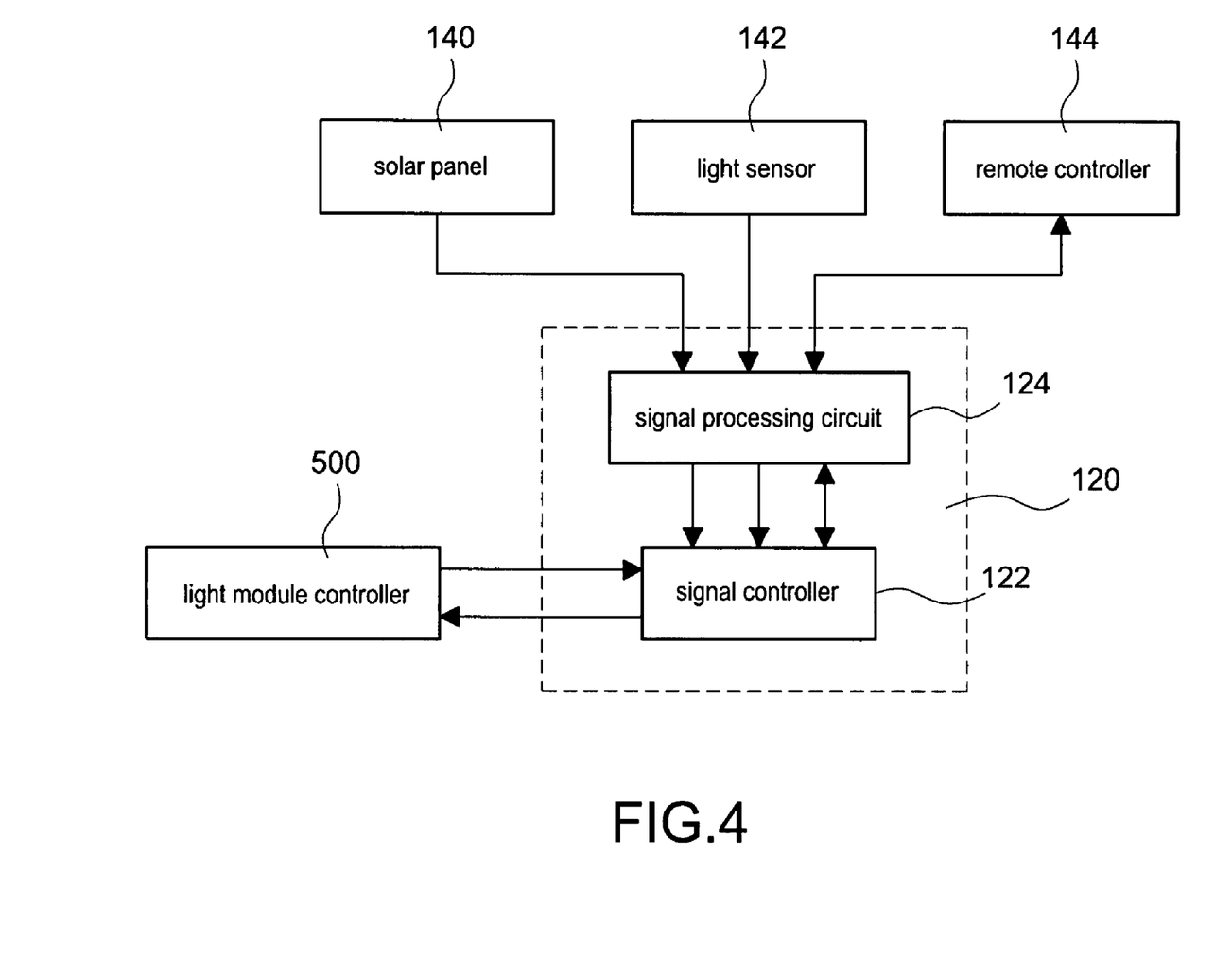
FIG. 4 is a schematic view of connecting inner elements of a an external signal receiving control module and other units.

Reference is made to FIG. 4 which is a schematic view of connecting inner elements of an external signal receiving control module and other units. The external signal receiving control module 120 includes a signal controller 122 and a signal processing circuit 124. The external signal receiving control module 120 is connected to the solar panel 140, the light sensor 142, and the remote controller 144 via the signal processing circuit 124. The signal controller 122 is electrically connected to the light module controller 500 and processes signals transmitted from the solar panel 140, the light sensor 142, and the remote controller 144.

Figure 5:
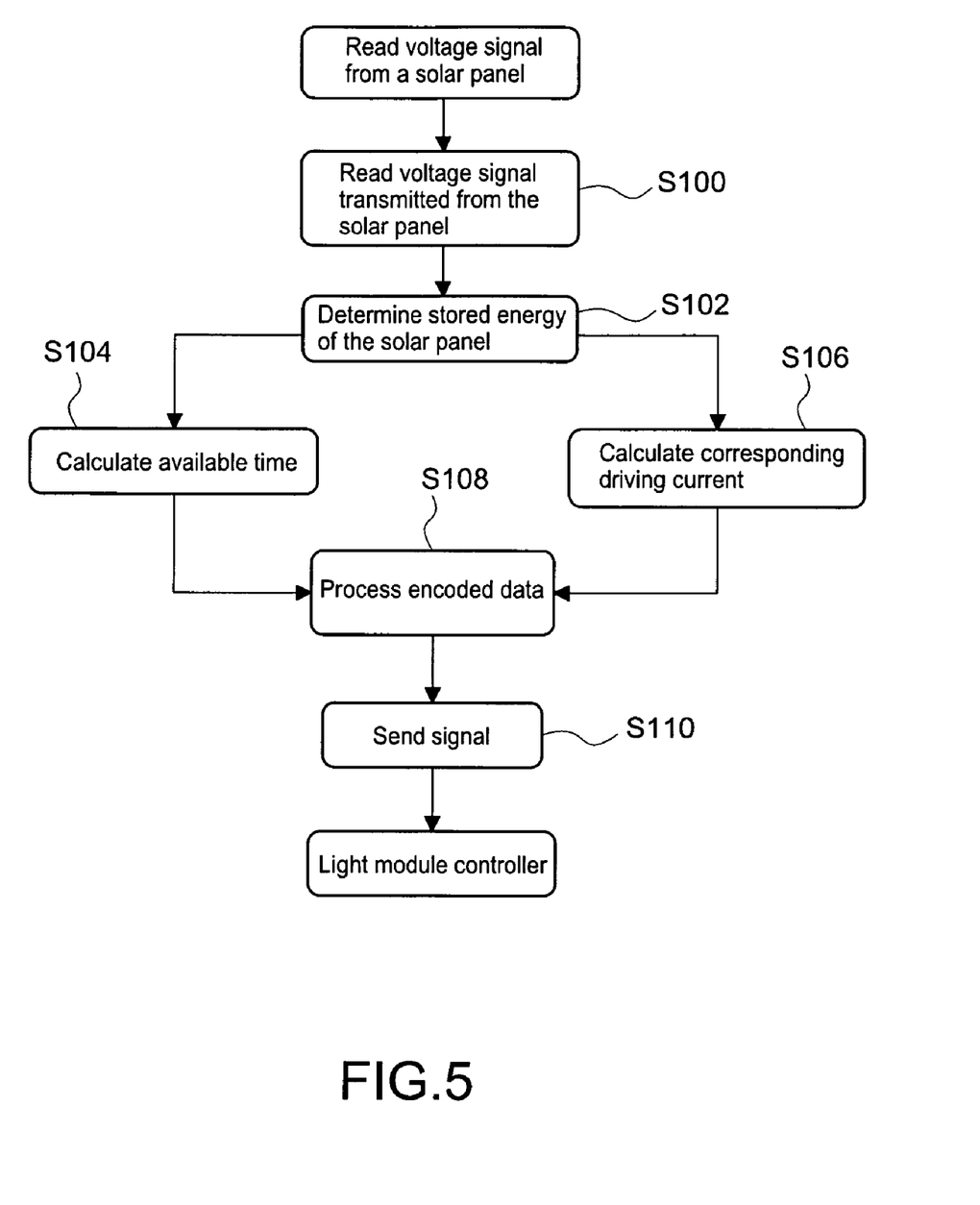
FIG. 5 is a flowchart of processing a signal provided from a solar panel by the external signal receiving control module.

Reference is made to FIG. 5 which is a flowchart of processing a signal provided from a solar panel by the external signal receiving control module. A voltage signal transmitted from the solar panel is read (S100). Afterward, the external signal receiving control module is used to determine stored energy of the solar panel (S102). An available time is calculated according to the stored energy (S104), and a corresponding driving current is calculated (S106). Afterward, the calculated data are encoded by the external signal receiving control module (S108). The encoded signals are transmitted to the light module controller (S110). Hence, the light module controller can control a driving current according to stored energy of the solar panel.

Figure 6:
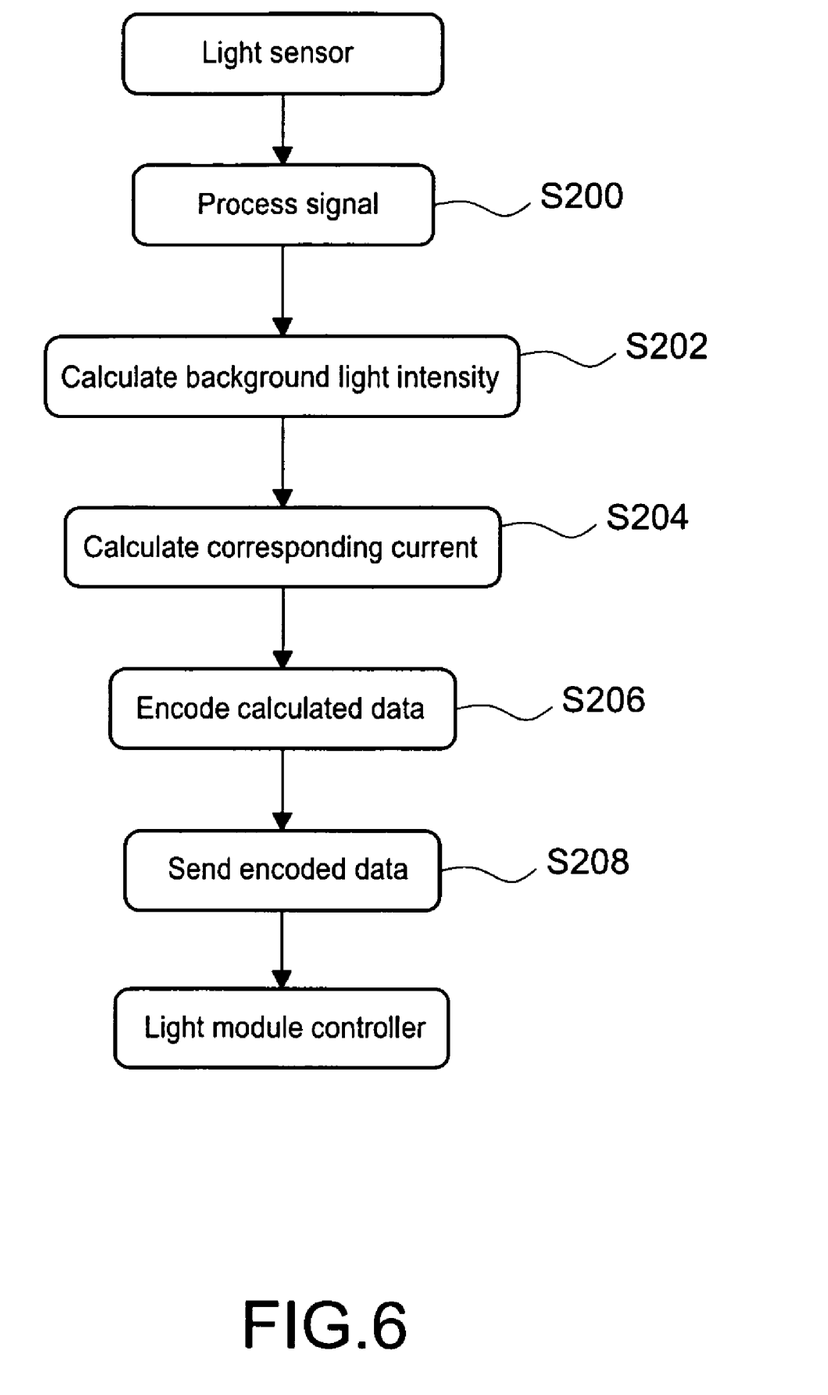
FIG. 6 is a flowchart of processing a signal provided from a light sensor by the external signal receiving control module.

Reference is made to FIG. 6 which is a flowchart of processing a signal provided from a light sensor by the external signal receiving control module. First, the external signal receiving control module processes a background light signal transmitted from the light sensor (S200). Afterward, a background light intensity is calculated (S202), and a corresponding current is calculated (S204). Afterward, the calculated data are encoded as an encoded signal by the external signal receiving control module (S206). The encoded signal is transmitted to the light module controller (S208), therefore, the light module controller can control a driving current according to the background light intensity.

Figure 7:
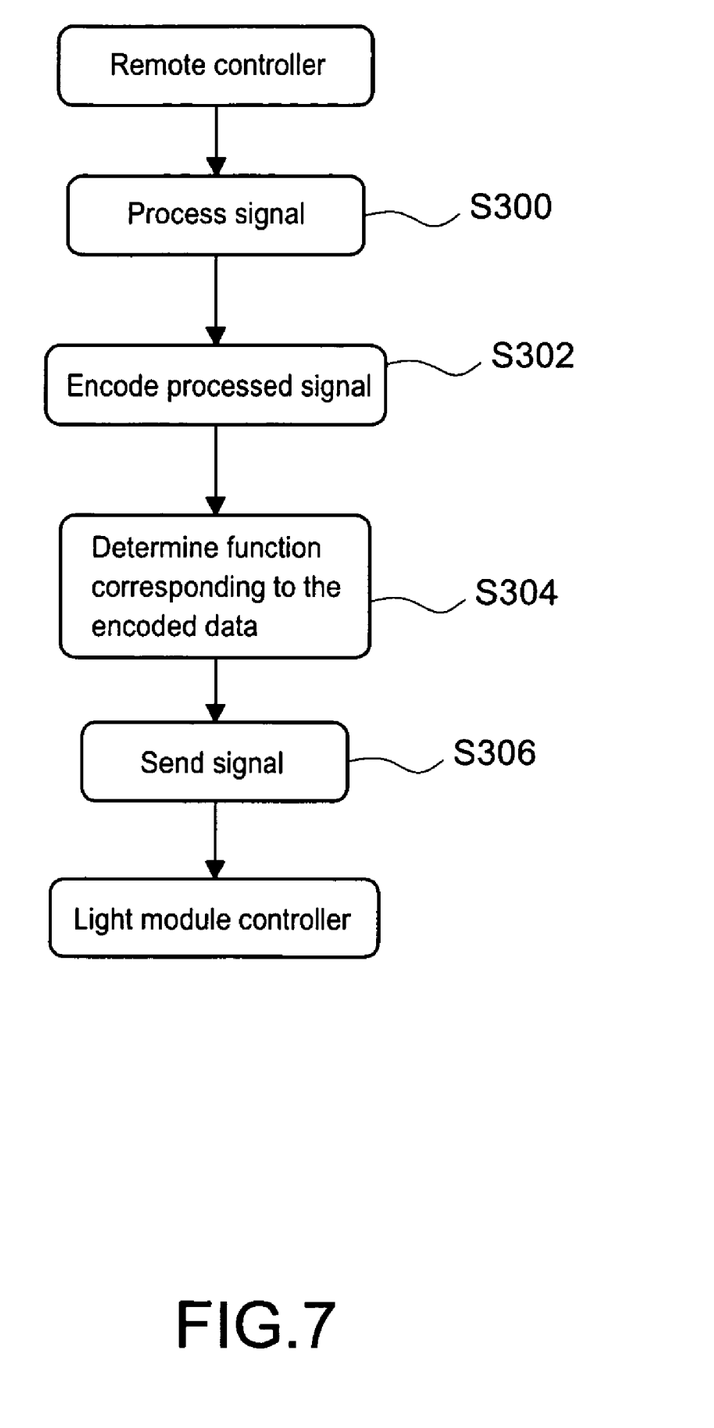
FIG. 7 is a flowchart of processing a signal provided from a remote controller by the external signal receiving control module.

Reference is made to FIG. 7 which is a flowchart of processing a signal provided from a remote controller by the external signal receiving control module. First, the external signal receiving control module processes a signal transmitted from the remote controller (S300). Afterward, the processed signal is encoded as an encoded signal (S302) and the function there is judged (S304) and then transmitted to the light module controller (S306). Therefore, the light module controller can control a driving current according to a command of the remote controller.

Figure 8:
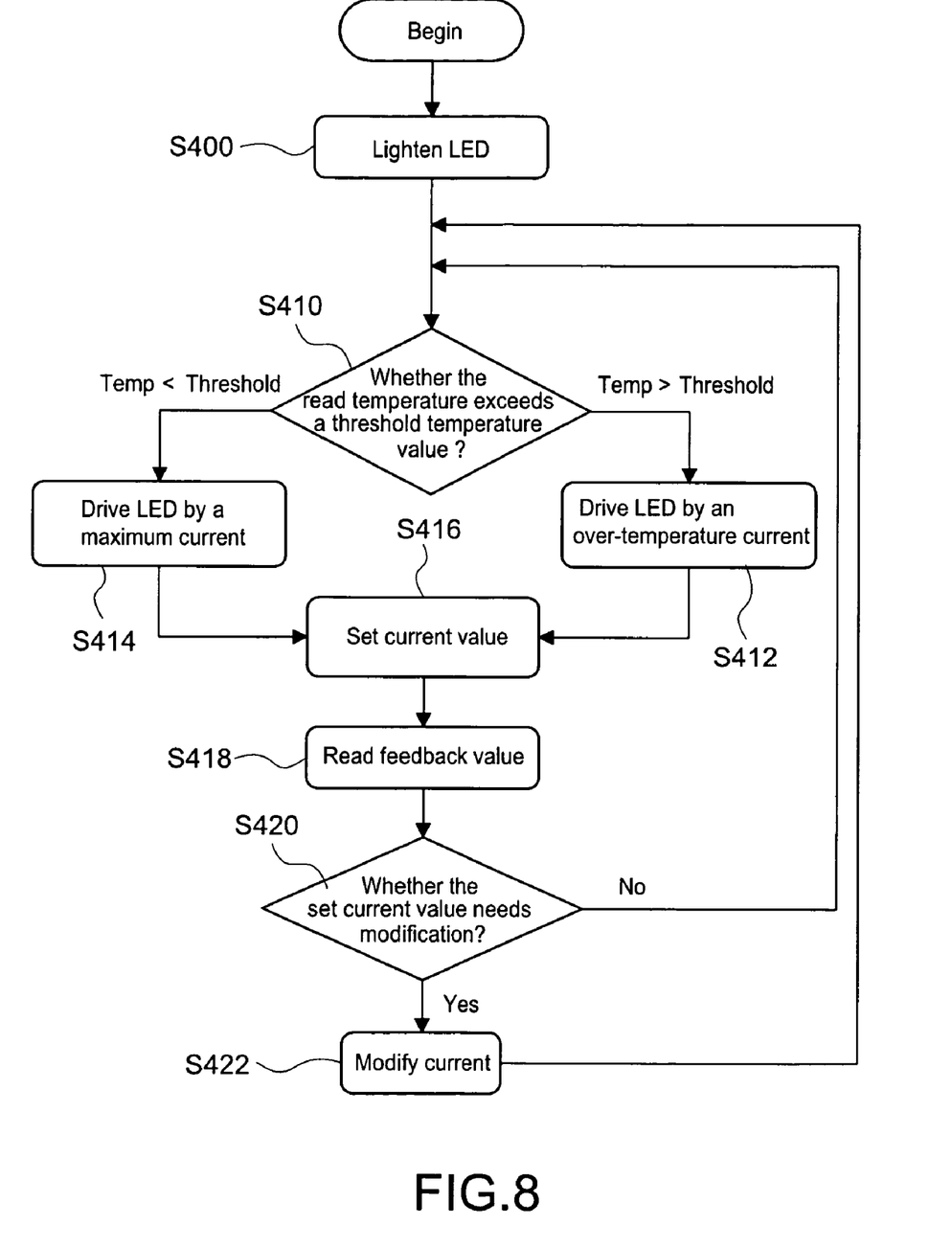
FIG. 8 is a flowchart of processing a temperature protection by a light module controller.

Reference is made to FIG. 8 which is a flowchart of processing a temperature protection by a light module controller. First, the LED illuminations are lightened (S400). Afterward, the light module controller 500 reads a temperature sensed by the temperature sensor and determines whether the read temperature exceeds a threshold temperature value or not (S410). The corresponding LED illuminator is driven by an over-temperature current when the read temperature exceeds the threshold temperature value (S412). The corresponding LED illuminator is driven by a maximum current when the read temperature does not exceed the threshold temperature value (S414). The light module controller sets a current value according to the results of the S412 and S414 (S416). Afterward, the light module controller reads feedback signals transmitted from the over-voltage protective circuits and the voltage-current-temperature feedback units (S418), and determines whether the set current value needs modification or not according to the feedback signals (S420). The set current value is modified when the set current value needs modification (S422). The procedure returns to the step S410 when the set current value does not need modification.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A LED illumination system with multiple independent loops driving a plurality of LED illuminators, the LED illumination system comprising:
   an input unit receiving a D.C. power; and
   a plurality of light module control circuits electrically connected to the input unit;
   wherein each of the light module control circuits includes:
      a light module controller; and
      two filtering units electrically connected to the light module controller and receiving the D.C. power, and the two filtering units electrically connected to two set of LED illuminators, respectively;
      wherein the light module controller is provided to control the LED illuminators via the filtering units so as to control brightness of the LED illuminators,
   wherein each of the light module control circuits further comprises:
      at least one voltage-current-temperature feedback unit connected between the LED illuminator and the light module controller to feedback a voltage-current-temperature signal.

2. The LED illumination system in claim 1, wherein each of the light module control circuits further comprises:
   at least one over-voltage protective circuit electrically connected between the filtering units and the light module controller to feedback an over-voltage signal.

3. The LED illumination system in claim 1, further comprising:
   a temperature sensor installed between the two set of LED illuminators, and electrically connected to the corresponding light module control circuit;
   wherein the light module controller is used to receive a temperature value sensed by the temperature sensor, and the sensed temperature is compared with a threshold temperature value to determine whether current supplied to the LED illuminators needs modification or not.

4. The LED illumination system in claim 3, further comprising:
   an external signal receiving control module electrically connected to the light module controller.

5. The LED illumination system in claim 4, further comprising:
   a solar panel electrically connected to the external signal receiving control module and outputting a voltage signal to the external signal receiving control module to indicate stored energy of the solar panel.

6. The LED illumination system in claim 4, further comprising:
   a light sensor electrically connected to the external signal receiving control module to provide a signal of background light.

7. The LED illumination system in claim 4, further comprising:
   a remote controller electrically connected to the external signal receiving control module to remotely control the light module controller.

* * * * *